J. & C. E. CUMMINS.
Horse Hay-Fork.

No. 96,894.

Patented Nov. 16, 1869.

Witnesses:

Inventors:

United States Patent Office.

JEPTHA CUMMINS AND CAREY E. CUMMINS, OF PERRY, MICHIGAN.

Letters Patent No. 96,894, dated November 16, 1869.

---

IMPROVEMENT IN HORSE HAY-FORKS.

---

The Schedule referred to in these Letters Patent and making part of the same.

---

*To all whom it may concern:*

Be it known that we, JEPTHA CUMMINS and CAREY E. CUMMINS, of Perry, in the county of Shiawassee, and in the State of Michigan, have invented certain new and useful Improvements in Horse Hay-Forks; and do hereby declare that the following is a full, clear, and exact description thereof, reference being had to the accompanying drawings, and to the letters of reference marked thereon, making a part of this specification.

The nature of our invention consists in the construction of a horse hay-fork, and in the arrangement of the devices hereafter set forth and described.

Figure 1:
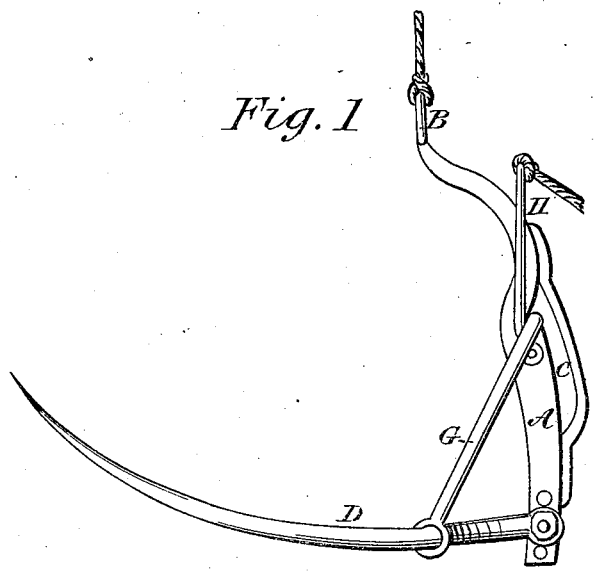
Figure 1 is a side elevation of our invention.
Figure 2:
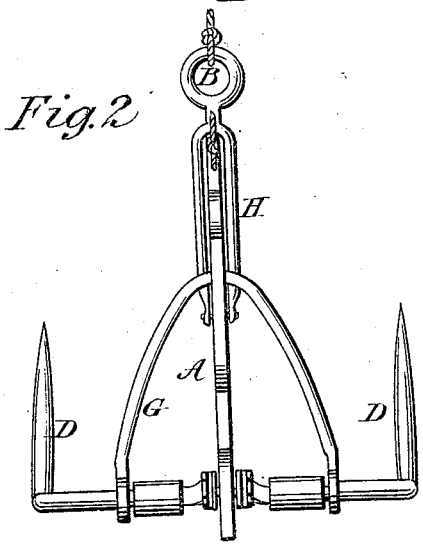
Figure 2 is a rear view of the same.

Letter A represents the handle of our fork, which has the loop B formed at its top, in which the elevating-cord is attached, an elongated slot, C, formed in its side, and a number of apertures formed in its lower end, in which the tines D are fastened.

These tines are formed of two separate bars, which are pivoted to the lower part of the handle, by means of a bolt, and by raising and lowering them, by means of the apertures, the amount of hay which is to be lifted can be varied at pleasure.

Secured to these tines, is a clevis, G, which extends upward, and has its top moving up and down in the slot C.

In the upper part of the slot there is a notch formed, in which the clevis catches, so as to support the tines at right angles to the handle when loaded with hay.

Pivoted to the side of the handle, just below the notch, is the trigger H, to which the trip-cord is attached, and which is used to dump the load from the tines.

When it is desired to load the fork, the clevis is loosened from the notch, when the tines assume a vertical position, so that when dropped upon the hay, they will sink into it, from their own weight.

The handle is then bent over until the clevis again catches in the notch, when the load is ready to be raised.

As soon as it has reached the proper place, a slight pull upon the trip-cord causes the trigger to loosen the clevis, when the fork is at once emptied.

Having thus described our invention,

What we claim, and desire to secure by Letters Patent, is—

1. The handle A, provided with the loop B, notched slot C, and apertures in its lower end, so as to regulate the tines, substantially as set forth.

2. The handle A, constructed as described, in combination with the clevis G, tines D, and trigger H, when combined to form a horse hay-fork, substantially as shown.

In testimony that we claim the foregoing, we have hereunto set our hands and seals, this 6th day of July, 1869.

JEPTHA CUMMINS. [L. S.]
C. E. CUMMINS. [L. S.]

Witnesses:
BENJN. WALKER,
ISABELLA PECK.